(12) United States Patent
Zhang et al.

(10) Patent No.: US 10,844,946 B2
(45) Date of Patent: Nov. 24, 2020

(54) GEAR ASSEMBLY, REDUCTION GEAR AND CLEANING ROBOT

(71) Applicant: Nidec Corporation, Kyoto (JP)

(72) Inventors: Tiecheng Zhang, Kyoto (JP); Xuechao Zhang, Kyoto (JP); Zhenmin Han, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 214 days.

(21) Appl. No.: 16/039,374

(22) Filed: Jul. 19, 2018

(65) Prior Publication Data

US 2019/0032767 A1   Jan. 31, 2019

(30) Foreign Application Priority Data

Jul. 26, 2017  (CN) .......................... 2017 1 0617495

(51) Int. Cl.
  *F16H 57/022*  (2012.01)
  *A47L 11/40*   (2006.01)
  (Continued)

(52) U.S. Cl.
  CPC ........ *F16H 57/022* (2013.01); *A47L 11/4069* (2013.01); *F16H 1/08* (2013.01); *F16H 57/0006* (2013.01); *F16H 57/021* (2013.01); *F16H 57/031* (2013.01); *H02K 7/003* (2013.01); *H02K 7/116* (2013.01); *H02K 7/12* (2013.01);
  (Continued)

(58) Field of Classification Search
  CPC ............. A47L 11/4069; A47L 2201/00; A47L 9/0081; A47L 9/0433; A47L 9/068; F16H 1/08; F16H 2057/02034; F16H 2057/0221; F16H 57/0006; F16H 57/021; F16H 57/022; F16H 57/031; H02K 21/22; H02K 2213/03; H02K 7/003; H02K 7/116; H02K 7/12; H02K 7/125
  See application file for complete search history.

(56) References Cited

U.S. PATENT DOCUMENTS

2013/0086760 A1 * 4/2013 Han ..................... A47L 11/4055
                                                        15/49.1
2015/0075923 A1 * 3/2015 Jang ....................... H02K 7/116
                                                        188/162

(Continued)

FOREIGN PATENT DOCUMENTS

CN         204074580 U  *  1/2015
CN         207333583 U  *  5/2018
(Continued)

*Primary Examiner* — Marc Carlson
(74) *Attorney, Agent, or Firm* — Keating & Bennett

(57) ABSTRACT

A gear assembly includes an upper cover and a lower cover, a stator fixed to the lower cover, a rotor opposite to the stator and including a rotary shaft and magnet, a main gear fixed to the rotary shaft and rotating along with the rotary shaft, and a helical gear engaged with the main gear, the main gear and the helical gear being both received in the cover member, the upper cover including a boss portion with a recess receiving a tip of the rotary shaft. The rotor is axially movable and when the rotary shaft stops rotating, the tip of the rotary shaft is in the recess of the boss portion, and when the rotary shaft rotates, the helical gear applies a force on the main gear, and the tip of the rotary shaft is disengaged from the recess of the boss portion.

5 Claims, 3 Drawing Sheets

(51) Int. Cl.
*F16H 57/031* (2012.01)
*F16H 57/021* (2012.01)
*F16H 1/08* (2006.01)
*F16H 57/00* (2012.01)
*H02K 7/116* (2006.01)
*H02K 21/22* (2006.01)
*H02K 7/00* (2006.01)
*H02K 7/12* (2006.01)
*F16H 57/02* (2012.01)

(52) U.S. Cl.
CPC ............. *H02K 7/125* (2013.01); *H02K 21/22* (2013.01); *A47L 2201/00* (2013.01); *F16H 2057/0221* (2013.01); *F16H 2057/02034* (2013.01); *H02K 2213/03* (2013.01)

(56) References Cited

U.S. PATENT DOCUMENTS

2015/0265122 A1 9/2015 Han et al.
2017/0209015 A1* 7/2017 Liu .................. A47L 9/009
2018/0347681 A1* 12/2018 Masuzawa ............ F16H 57/021

FOREIGN PATENT DOCUMENTS

JP 2017-077088 A 4/2017
JP 2017077088 A * 4/2017

* cited by examiner

GEAR ASSEMBLY, REDUCTION GEAR AND CLEANING ROBOT

CROSS REFERENCE TO RELATED APPLICATIONS

This application claims the benefit of priority to Chinese Patent Application No. 201710617495.6 filed on Jul. 26, 2017. The entire contents of this application are hereby incorporated herein by reference.

BACKGROUND OF THE INVENTION

1. Field of the Invention

The present invention relates to a gear assembly, a reduction gear and a cleaning robot.

2. Description of the Related Art

A cleaning robot usually includes a gear assembly, a main brush portion and a side brush portion. Driven by the gear assembly, the main brush portion and the side brush portion may rotate, so as to perform cleaning operations.

The gear assembly includes multiple gears, which are received in a space enclosed by an upper cover and a lower cover. In a gear assembly in an existing cleaning robot, an upper cover of the gear assembly has a recess, a tip of a rotary shaft of a motor may be received in the recess, so that the rotary shaft may be positioned.

In performing cleaning operations by the cleaning robot, the gears in the gear assembly transfer driving forces generated by the motor to the main brush portion and the side brush portion by rotating.

SUMMARY OF THE INVENTION

It was discovered by the inventors of the present application that significant friction is produced within a gear assembly during rotation of gears, which results in relatively large noises in a cleaning robot. Especially, as a tip of a rotary shaft is located in a recess, when the rotary shaft rotates, it was discovered that it is inevitable that the tip of the rotary shaft contacts with an internal peripheral surface of the recess, thus, noises are generated, which are major noises generated by the cleaning robot.

Preferred embodiments of the present invention provide a gear assembly, a reduction gear and a cleaning robot. A rotary shaft of a rotor in the gear assembly is axially movable, and when the rotary shaft rotates, a main gear fixed to the rotary shaft is subjected to forces applied by a helical gear surrounding and engaged with the main gear, such that a tip of the rotary shaft is disengaged from the recess of the upper cover, to significantly reduce or prevent noises generated due to contact of the tip of the rotary shaft and an internal peripheral surface of the recess.

According to a first preferred embodiment of the present invention, there is provided a gear assembly, including: a cover member including an upper cover and a lower cover; a stator fixed to the lower cover; a rotor opposite to the stator and including a rotary shaft and a magnet rotating around a central axis; a main gear fixed to the rotary shaft and rotating along with the rotary shaft; and a helical gear engaged with the main gear, the main gear and the helical gear being both received in the cover member; the upper cover including a boss portion, the boss portion including a recess receiving a tip of the rotary shaft; the rotor is axially movable; when the rotary shaft stops rotating, the tip of the rotary shaft is in the recess of the boss portion; and when the rotary shaft rotates, the helical gear applies a force on the main gear, and the tip of the rotary shaft is disengaged from the recess of the boss portion.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

These and further aspects and features of the present disclosure will be apparent with reference to the following description and attached drawings. In the description and drawings, preferred embodiments of the present have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims. Various preferred embodiments of this disclosure shall be described below with reference to the accompanying drawings, and these embodiments are illustrative only, and are not intended to limit this disclosure.

Furthermore, in the following description of this disclosure, for the sake of convenience of explanation, a direction of radius taking a central axis of a rotary shaft of a rotor as a center is referred to as "a radial direction", a direction of a circumference taking the central axis as a center is referred to as "a circumferential direction", a direction along a direction of the central axis is referred to as "an axial direction", a direction of the "axial direction" pointing to an upper cover is referred to as "an upward direction", and a direction opposite to the "upward direction" is referred to as "a downward direction".

Figure 1:
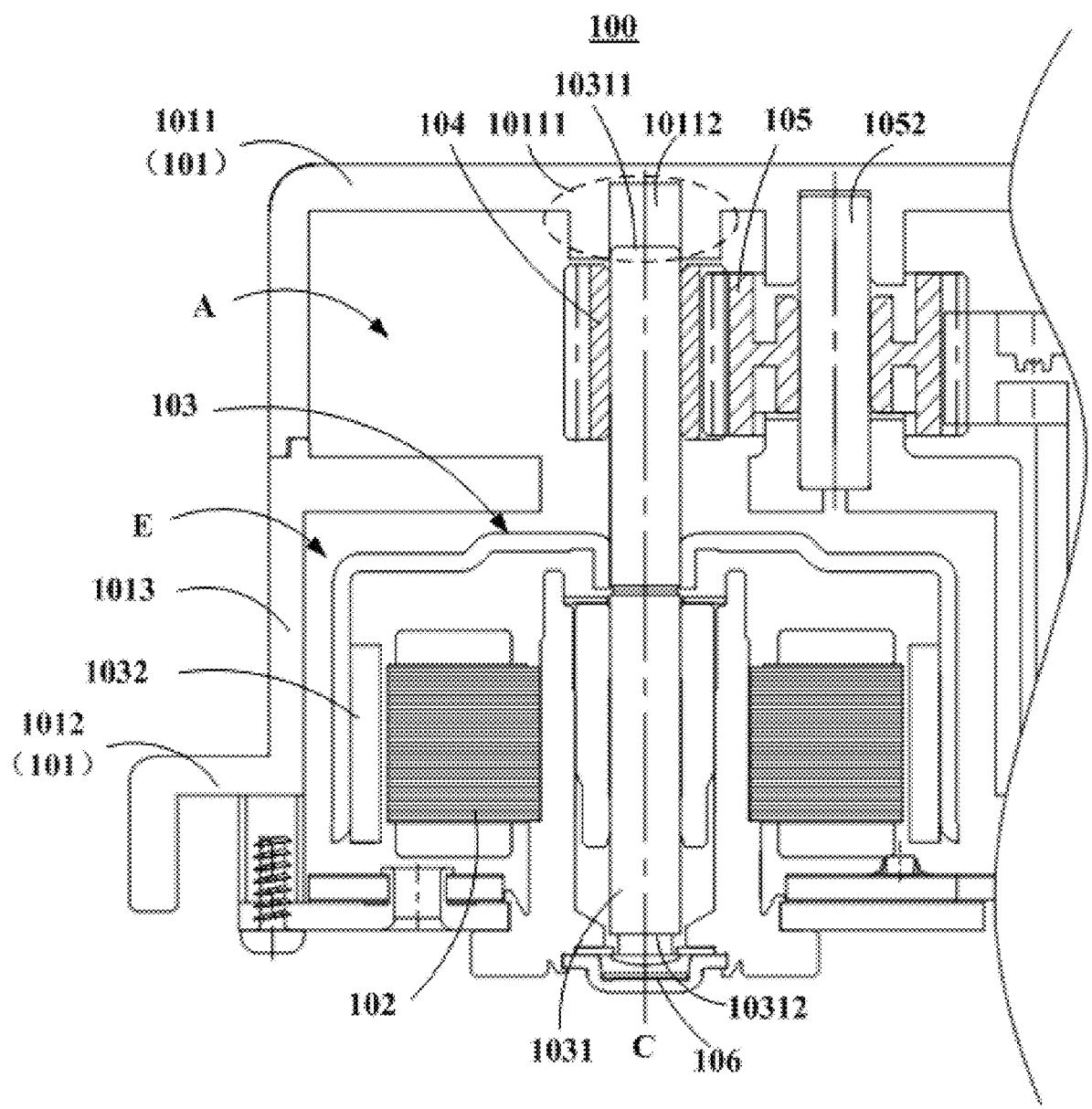
FIG. 1 is an axially sectional view of the gear assembly in a nonoperational state of Embodiment 1 of this disclosure.
Figure 2:
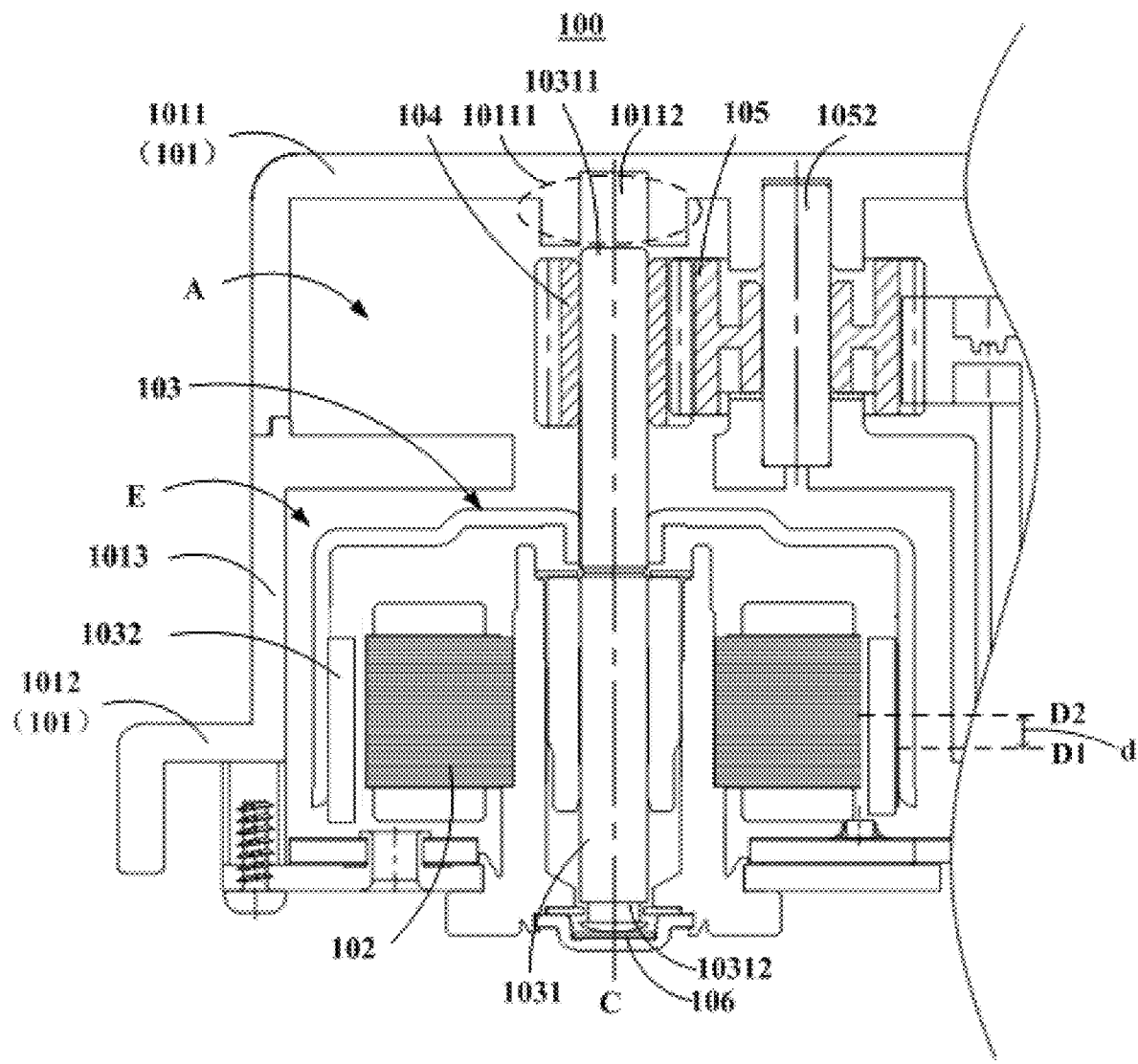
FIG. 2 is an axially sectional view of the gear assembly in a rotational state of the rotary shaft of Embodiment 1 of this disclosure.

The embodiment of this disclosure provides a gear assembly. FIG. 1 is an axially sectional view of the gear assembly in a nonoperational state of the embodiment of this disclosure. FIG. 2 is an axially sectional view of the gear assembly in a rotational state of the rotary shaft of the embodiment of this disclosure.

As shown in FIGS. 1 and 2, the gear assembly 100 includes a cover member 101, a stator 102, a rotor 103, a main gear 104 and a helical gear 105.

In this embodiment, the cover member 101 may include an upper cover 1011 and a lower cover 1012. The stator 102 may be fixed to the lower cover 1012. The rotor 103 may be arranged opposite to the stator 102 and may have a rotary shaft 1031 and a magnet 1032 rotating around a central axis C. The main gear 104 is fixed to the rotary shaft 1031 and rotates along with the rotary shaft 1031. And the helical gear 105 is engaged with the main gear 104, the main gear 104 and the helical gear 105 being both received in a space A enclosed by the upper cover 1011 and the lower cover 1012.

In this embodiment, the upper cover 1011 may have a boss portion 10111. The boss portion 10111 having a recess 10112 receiving a tip of the rotary shaft 10311.

In this embodiment, the helical gear 105 may be axially fixed. And the rotor 103 may be axially movable. As shown in FIG. 1, when the rotary shaft 1031 stops rotating, the tip 10311 of the rotary shaft 1031 is in the recess 10122 of the boss portion 10111. When the rotary shaft 1031 rotates, the helical gear 105 applies a force on the main gear 104, and the tip 10311 of the rotary shaft 1031 is disengaged from the recess 10122 of the boss portion 10111.

With the embodiment of this disclosure, when the rotary shaft rotates, its tip is disengaged from the recess, which may avoid noises generated due to contact of the tip of the rotary shaft and an internal peripheral surface of the recess, thereby reducing noises generated by the gear assembly.

Figure 3:
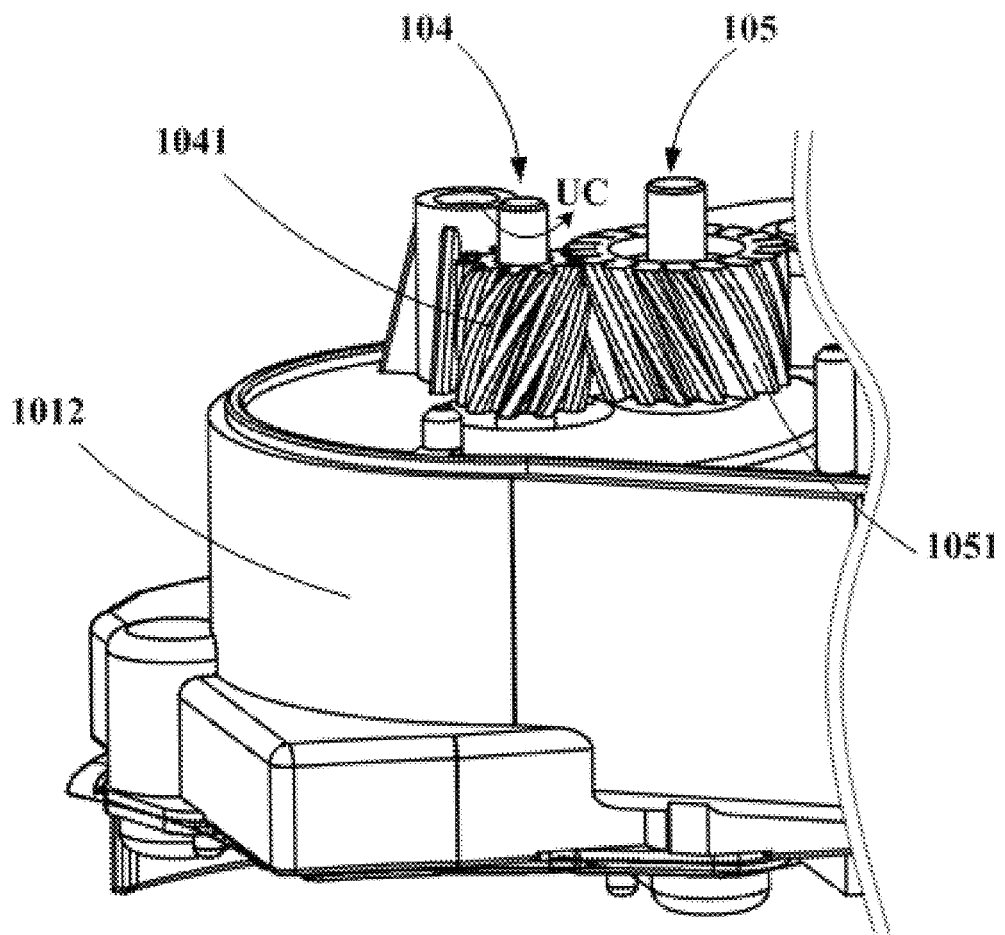
FIG. 3 is a stereoscopic view of the main gear and the helical gear of Embodiment 1 of this disclosure.

FIG. 3 is a stereoscopic view of the main gear and the helical gear of the embodiment of this disclosure, in which the main gear 104, the helical gear 105 and the lower cover 1012 are shown, but the upper cover 1011 is not shown.

As shown in FIG. 3, teeth 1041 of the main gear 104 may be engaged with teeth 1051 of the helical gear 105. Hence, when the main gear 104 rotates, the teeth 1051 may be driven by the teeth 1041, thereby driving the helical gear 105 to rotate. The teeth 1041 is subjected to a counterforce from the teeth 1051, and axial components of the counterforce may drive the main gear 104 to axially move downwards, thereby driving the rotor 103 to axially move downwards.

As shown in FIG. 3, the teeth 1051 of the helical gear 105 may be axially inclined, and the teeth 1041 of the main gear 104 may also be axially inclined. Hence, when the main gear 104 rotates in a counterclockwise direction UC in being viewed downwards, the teeth 1051 of the helical gear 105 may apply an axially downward force on the teeth 1041 of the main gear 104. Furthermore, what is shown in FIG. 3 is only one implementation of forms of the teeth 1041 of the main gear 104 and the teeth 1051 of the helical gear 105. However, this embodiment is not limited thereto; for example, an inclination direction of the teeth 1051 of the helical gear 105 and a form of the teeth 1041 of the main gear 104 may be set with reference to a direction of the rotary shaft in rotation, so that when the main gear 104 rotates, the helical gear 105 may apply the axially downward force on the main gear 104.

In this embodiment, as shown in FIG. 1, when the rotary shaft 1031 stops rotating, a magnetic interaction is generated between the magnet 1032 and the stator 102, the magnetic interaction making the rotor 103 subjected to an axially upward acting force, the acting force overcoming the gravity of the rotor 103 to make the rotor 103 to be in a suspended state. And when the rotor 103 is in the suspended state, the tip 10311 may be in the recess 10112, hence, when the gear assembly 100 is assembled, the tip of the rotary shaft may be positioned.

In this embodiment, as shown in FIG. 2, when the rotary shaft 1031 rotates, the rotor 103 is subjected to the axially downward force applied by the helical gear 105, and moves downwards to a position where the tip 1031 is disengaged from the recess 10112.

As shown in FIG. 2, in a state where the tip 10311 of the rotary shaft 1031 is disengaged from the recess 10112 of the boss portion, an axial center D1 of the magnet 1032 is axially configured in a staggered manner relative to an axial center D2 of the stator 102, that is, as the helical gear 105 applies an axially downward acting force on the rotor 103, an axial distance d is produced between the axial center D1 of the magnet 1032 of the rotor and the axial center D2 of the stator 102.

In this embodiment, the gear assembly 100 may also provide an axially upward acting force for the rotor 103 via another structure. For example, the gear assembly 100 may be provided with an elastomer, such as a spring, which may provide the axially upward acting force for the rotor 103. When the helical gear 105 applies the axially downward force on the main gear 104, the elastomer may be elastically deformed, such that the rotor 103 axially moves downwards.

In this embodiment, as shown in FIG. 1, the lower cover 1012 may have a recessed portion 1013 facing a concave portion of the upper cover 1011. An accommodation space E is formed in the recessed portion 1013, and at least a part of the rotor 103 together with the stator 101 are received in the recessed portion 1013. Hence, the lower cover 1012 may protect the recessed portion.

In this embodiment, the gear assembly 100 includes an outer rotor motor, the outer rotor motor having the stator 102 and the rotor 103. The magnet 1032 is disposed at a radial outer side of the stator 102. Furthermore, other parts of the outer rotor motor may also be contained in the gear assembly 100.

In this embodiment, an upper surface of the lower cover 1012 disposed axially opposite to a lower end 10312 of the rotary shaft 1031 may be configured with a thrust washer 106, the thrust washer 106 supporting the lower end 10312 of the rotary shaft 1031. Hence, when the rotary shaft 1031 rotates, axial force balance of the rotor 103 may be kept under actions of the downward acting force applied by the helical gear 105, the magnetic interaction between the magnet 1032 and the stator 102, the gravity of the rotor 103 and a supporting force of the thrust washer 106.

Furthermore, in this embodiment, the lower end 10312 of the rotary shaft 1031 contacts the thrust washer 106 at a relatively low pressure, which may reduce a friction between the lower end 10312 of the rotary shaft 1031 and the lower cover 1012, and extend a lifetime of the gear assembly.

In this embodiment, the upper cover 1011 may be fitted with the lower cover 1012 by a self-threading screw, thereby firmly fitting the upper cover and the lower cover. However, this embodiment is not limited thereto, and they may also be fitted by other means, such as a snap.

In this embodiment, as shown in FIG. 1, the helical gear 105 may be fixed to a rotary shaft 1052, hence, it rotates along with the rotary shaft 1052. The rotary shaft 1052 may be set to be axially fixed, hence, when the rotary shaft 1031 rotates, the helical gear 105 may stably apply forces on the main gear 104.

In this embodiment, the gear assembly 100 may include multiple gears, and the multiple gears may include the main gear 104 and the helical gear 105. Furthermore, the multiple gears may include other gears. With the multiple gears, the rotation of the rotary shaft 1031 may transferred to other parts, so as to drive the other parts to move. The other parts may be, for example, a main brush portion and/or a side brush portion.

According to this embodiment, the rotary shaft of the rotor in the gear assembly may be axially movable, and when the rotary shaft rotates, the main gear fixed to the rotary shaft is subjected to acting forces applied by a helical gear pair engaged with it and surrounding it, such that the tip of the rotary shaft is disengaged from the recess of the upper cover, thereby avoiding noises generated due to contact of the tip of the rotary shaft and the internal peripheral surface of the recess.

Embodiment 2 of this disclosure provides a reduction gear device, including the gear assembly 100 described in Embodiment 1. As the gear assembly has been described in Embodiment 1, the contents thereof are incorporated herein, which shall not be described herein any further.

According to this embodiment, noises are significantly reduced or prevented.

Embodiment 3 of this disclosure provides a cleaning robot, including a main brush portion, a side brush portion and the reduction gear as described in Embodiment 2. The reduction gear drives the main brush portion and the side brush portion. As the reduction gear has been described in Embodiment 2, the contents thereof are incorporated herein, which shall not be described herein any further.

According to this embodiment, when the rotary shaft of the rotor in the gear assembly of the cleaning robot rotates, the tip of the rotary shaft is disengaged from the recess of the upper cover, thereby avoiding noises generated due to contact of the tip of the rotary shaft and the internal peripheral surface of the recess, and reducing noises generated by the cleaning robot.

This disclosure is described above with reference to particular embodiments; however, it should be understood by those skilled in the art that such description is illustrative only, and is not intended to limit the protection scope of this disclosure. And various variants and modifications may be made by those skilled in the art according to the spirits and principle of this disclosure, and such variants and modifications are also within the protection scope of this disclosure.

What is claimed is:

1. A gear assembly, comprising:
    a cover structure including an upper cover and a lower cover;
    a stator fixed to the lower cover;
    a rotor opposite to the stator and including a rotary shaft and a magnet rotating around a central axis;
    a main gear fixed to the rotary shaft and rotating along with the rotary shaft; and
    a helical gear engaged with the main gear; wherein
    the main gear and the helical gear are both received in the cover structure; the upper cover includes a boss including a recess receiving a tip of the rotary shaft;
    the rotor is axially movable;
    the helical gear is axially fixed;
    when the rotary shaft stops rotating, the tip of the rotary shaft is in the recess of the boss; and
    when the rotary shaft rotates, the helical gear applies a force on the main gear, and the tip of the rotary shaft is disengaged from the recess of the boss.

2. The gear assembly according to claim 1, wherein in a state where the tip of the rotary shaft is disengaged from the recess of the boss, an axial center of the magnet is axially configured in a staggered manner relative to an axial center of the stator.

3. The gear assembly according to claim 1, wherein
    the lower cover includes a recessed portion depressed to the upper cover; and
    at least a portion of the rotor together with the stator are received in the recessed portion.

4. The gear assembly according to claim 3, wherein the gear assembly includes an outer rotor motor including the stator and the rotor, and the magnet is disposed at a radial outer side of the stator.

5. The gear assembly according to claim 1, wherein an upper surface of the lower cover disposed axially opposite to a lower end of the rotary shaft includes a thrust washer.

* * * * *